J. B. STEINDL.
EXPANDING REAMER.
APPLICATION FILED OCT. 31, 1912.
1,086,867.
Patented Feb. 10, 1914.
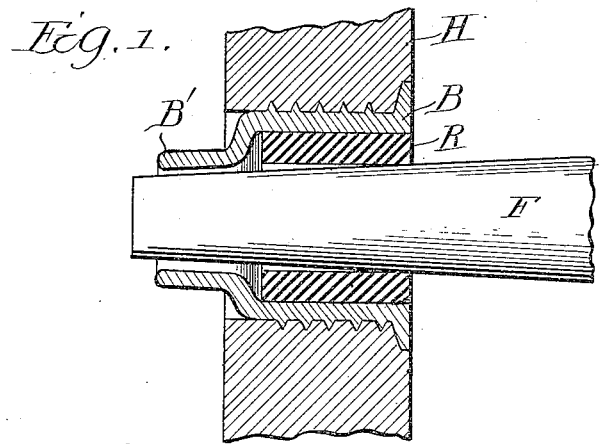
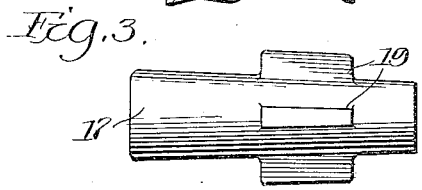
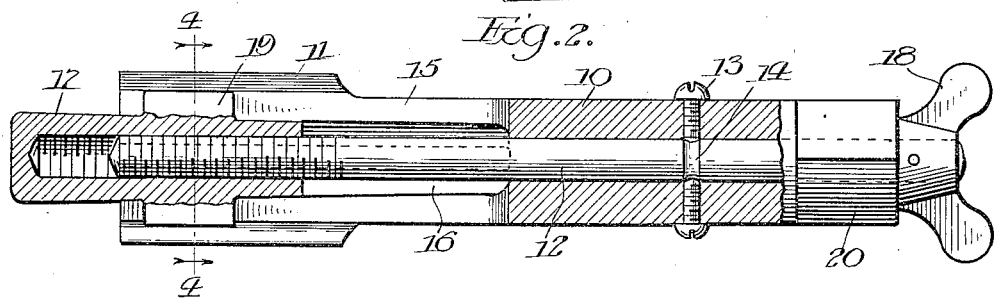
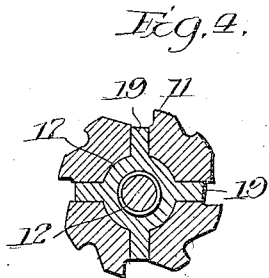
Witnesses
Inventor
John B. Steindl
by Casper L. Redfield, atty.

UNITED STATES PATENT OFFICE.

JOHN B. STEINDL, OF CHICAGO, ILLINOIS.

EXPANDING REAMER.

1,086,867.

Specification of Letters Patent.

Patented Feb. 10, 1914.

Application filed October 31, 1912. Serial No. 728,763.

*To all whom it may concern:*

Be it known that I, JOHN B. STEINDL, a citizen of the United States of America, and a resident of Chicago, county of Cook, and State of Illinois, have invented certain new and useful Improvements in Expanding Reamers, of which the following is a specification.

My invention relates to and has for its object improvements in expanding reamers.

In the accompanying drawings, Figure 1 is a section of the device on which it is intended to use the reamer, together with the parts normally associated therewith, the same being shown for the purpose of giving a better understanding of the object and purpose of the reamer; Fig. 2 is a partial longitudinal section of the reamer; Fig. 3 is a side elevation of the expanding core for the reamer; and Fig. 4 is a transverse section on line 4—4 of Fig. 2.

In Fig. 1, H represents part of the head of a beer barrel into which is screwed a bushing B. Before the barrel is filled at the brewery, the end B¹ of the bushing B is closed by a cork which prevents the escape of the beer. When it is desired to tap the barrel, a rubber ring R is inserted in the bushing B and a faucet, the tapering part of which is shown at F, is driven in to simultaneously displace the cork and expand the ring R against the inner walls of the bushing. While the joint thus made is tight enough for practical purposes, there is some leak of beer around the ring which corrodes the inner face of the bushing. After the barrel has been filled a number of times this corrosion becomes so great that the rubber ring no longer serves to make a tight joint, and either a new bushing must be provided, or the corroded one must be cleaned sufficiently for the rubber ring to make a fairly tight joint. While this reamer is adapted for use in connection with other devices of a similar character, it is designed especially for the cleaning of such corroded surfaces.

In the remaining views of the drawings, 10 is the shank of the reamer, on one end of which are the cutting teeth 11. Through the reamer and its shank is an axial opening for the reception of a screw 12 which is held from axial displacement by small screws 13 entering a circumferential groove 14 in the body of the screw 12.

Between the teeth 11, and extending well up into the shank 10, are radial slots 15 which separate the cutting parts from each other and leave them flexible projections from the shank 10. The central axial opening in the slotted portion is somewhat larger in diameter than the part of this opening which guides the screw 12. This larger diameter of opening is shown at 16, and in this opening is located the expanding cone 17. This expanding cone is tapped out and adapted to receive the threaded end of the screw 12. By means of the thumb nut 18 on the screw 12 it may be turned to move the expanding cone 17 either in or out, and thus expand the cutting teeth 11.

On the exterior of the expanding cone 17, and preferably integral therewith, are radial projections 19 adapted to fit into the slots 15 and prevent the cone 17 from turning when the screw 12 is turned. The projections 19 are made to fit the slots 15 and are longitudinally tapered to correspond to the taper of the cone 17, as shown in Fig. 3. The object of this taper is to maintain the fit between the projections 19 and the walls of the slots 15 as these slots are opened and closed by the axial movement of the cone 17. As thus made the teeth are prevented from chattering when engaging the irregular and corroded surfaces of the bushing B.

Bushings B are rough castings not ordinarily touched by a tool prior to use unless the roughness is greater than commonly found in castings coming directly from the foundry. Owing to the excessive roughness of a corroded bushing and the comparative shallowness of the part which contains the rubber ring R, the expanding cone is purposely made long enough to extend a considerable distance beyond the cutting teeth 11, and is given a diameter but slightly less than that of the cork-holding portion B¹. By this means the projecting end of the cone 17 assists in guiding the reamer when being used to clean the interior of the bushing B. The upper end of the reamer is squared, as shown at 20 for the reception of a handle.

What I claim is:—

1. A reamer having radial slots separating its cutting teeth, an expanding cone having radial projections adapted to fit said slots, and a screw for moving said cone axially within said reamer.

2. A reamer having radial slots separating its cutting teeth, an expanding cone having radial projections adapted to enter said slots, said projections being longitudinally tapered to correspond to the taper of the cone, and means for moving said cone axially in said reamer.

3. The combination with a reamer having its cutting portion radially slotted and having an axial opening through the cutting and shank portions thereof, a screw extending through the axial opening, means for operating said screw from the shank end of the reamer, and means for holding said screw from axial movement when being operated, of an expanding cone engaged and moved by said screw.

Signed at Chicago, Illinois, this 29th day of October 1912.

JOHN B. STEINDL.

Witnesses:
C. L. REDFIELD,
WM. STEINDL.

Copies of this patent may be obtained for five cents each, by addressing the "Commissioner of Patents, Washington, D. C."